United States Patent
Bennett et al.

(10) Patent No.: US 11,656,984 B2
(45) Date of Patent: *May 23, 2023

(54) KEEPING ZONES OPEN WITH INTERMEDIATE PADDING

(71) Applicant: Western Digital Technologies, Inc., San Jose, CA (US)

(72) Inventors: Alan D. Bennett, Edinburgh (GB); Liam Parker, Edinburgh (GB); Daniel L. Helmick, Broomfield, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/455,887

(22) Filed: Nov. 19, 2021

(65) Prior Publication Data

US 2022/0075718 A1 Mar. 10, 2022

Related U.S. Application Data

(63) Continuation of application No. 16/853,408, filed on Apr. 20, 2020, now Pat. No. 11,200,161.

(51) Int. Cl.
*G06F 3/06* (2006.01)
*G06F 12/02* (2006.01)

(52) U.S. Cl.
CPC ........ *G06F 12/0246* (2013.01); *G06F 3/0604* (2013.01); *G06F 3/0626* (2013.01)

(58) Field of Classification Search
CPC ... G06F 12/0246; G06F 3/0604; G06F 3/0626
See application file for complete search history.

(56) References Cited

U.S. PATENT DOCUMENTS

| | | | |
|---|---|---|---|
| 9,838,500 B1 | 12/2017 | Ilan et al. | |
| 2012/0311371 A1* | 12/2012 | Shaeffer | G06F 13/287 713/501 |
| 2017/0032843 A1* | 2/2017 | Ilani | G06F 12/0246 |
| 2017/0060447 A1 | 3/2017 | Moon et al. | |

(Continued)

OTHER PUBLICATIONS

International Search Report and the Written Opinion for International Application No. PCT/US2020/064601 dated Apr. 12, 2021, 8 pages.

(Continued)

*Primary Examiner* — Mohammed A Bashar
(74) *Attorney, Agent, or Firm* — Patterson + Sheridan, LLP; Steven H. VerSteeg

(57) ABSTRACT

The present disclosure generally relates to methods of operating storage devices. The storage device comprises a controller and a media unit divided into a plurality of zones. Data associated with one or more first commands is written to a first portion of a first zone. Upon a predetermined amount of time passing, dummy data is written to a second portion of the first zone to fill the first zone to a zone capacity. Upon receiving one or more second commands to write data, a second zone is allocated and opened, and the data associated with the one or more second commands is written to a first portion of the second zone. The data associated with the one or more first commands is then optionally re-written to a second portion of the second zone to fill the second zone to a zone capacity, and the first zone is erased.

20 Claims, 11 Drawing Sheets

(56) References Cited

U.S. PATENT DOCUMENTS

| | | |
|---|---|---|
| 2019/0303226 A1 | 10/2019 | Kim et al. |
| 2019/0371405 A1 | 12/2019 | Kim et al. |
| 2020/0089407 A1 | 3/2020 | Baca et al. |
| 2021/0056023 A1 | 2/2021 | Jin et al. |

OTHER PUBLICATIONS

Aghayev "Adopting Zoned Storage in Distributed Storage Systems," CMU-CS-20-130, Ph.D. Thesis, Computer Science Department, School of Computer Science, Carnegie Mellon University, Aug. 2020, retrieved from <http://reports-archive.adm.cs.cmu.edu/anon/2020/abstracts/20-130.html>, 2 pages.

* cited by examiner

KEEPING ZONES OPEN WITH INTERMEDIATE PADDING

CROSS-REFERENCE TO RELATED APPLICATIONS

This application is a continuation of co-pending U.S. patent application Ser. No. 16/853,408, filed Apr. 20, 2020, which is herein incorporated by reference.

BACKGROUND OF THE DISCLOSURE

Field of the Disclosure

Embodiments of the present disclosure generally relate to storage devices, such as sold state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each logical block address is associated with a physical location on an erase block so that the SSD and/or the host device know the location of where the data is stored. One or more erase blocks may be grouped together by their respective logical block addresses to form a grouping or a zone. Data is typically written to each of the erase blocks in a grouping or a zone prior to writing data to erase blocks in a new grouping or a new zone.

As data is written to erase blocks of a grouping or zone, the grouping or zone may be partially full for an amount of time. The longer the amount of time the grouping or zone remains partially full, the more prone to errors the grouping or zone becomes. As such, the data stored in the partially full grouping or zone may become lost or damaged, negatively affecting the reliability of the data.

Therefore, what is needed is a new method of operating a storage device that decreases the error rate of data stored in the storage device and improves the reliability of the data.

SUMMARY OF THE DISCLOSURE

The present disclosure generally relates to methods of operating storage devices. The storage device comprises a controller and a media unit divided into a plurality of zones. Data associated with one or more first commands is written to a first portion of a first zone. Upon a predetermined amount of time passing, dummy data is written to a second portion of the first zone to fill the first zone to a zone capacity. Upon receiving one or more second commands to write data, a second zone is allocated and opened, and the data associated with the one or more second commands is written to a first portion of the second zone. The data associated with the one or more first commands is then optionally re-written to a second portion of the second zone to fill the second zone to a zone capacity, and the first zone is erased.

In one embodiment, a storage device comprises of a media unit, wherein the capacity of the media unit is divided into a plurality of zones. The media unit comprises a plurality of dies and each of the plurality of dies comprises a plurality of erase blocks. The storage device further comprises a controller coupled to the media unit. The controller is configured to receive one or more first commands to write data to a first zone of the plurality of zones, wherein the data associated with the one or more first commands is written to a first portion of the first zone, and wherein a second portion of the first zone remains available to write data to. The controller is also configured to determine a predetermined amount of time has passed since receiving a first command to write data to the first zone and write dummy data to the second portion of the first zone to fill the first zone to a zone capacity. The controller is further configured to open a second zone and write the data associated with the one or more second commands to a first portion of the second zone upon receiving one or more second commands to write data to the first zone. The controller is also configured to re-write the data associated with the one or more first commands written to the first portion of the first zone to a second portion of the second zone.

In another embodiment, a storage device comprises of a media unit, wherein a capacity of the media unit is divided into a plurality of zones. The media unit comprises a plurality of dies and each of the plurality of dies comprises a plurality of erase blocks. The storage device further comprises a controller coupled to the media unit. The controller is configured to receive one or more first commands to write data to a first zone of the plurality of zones, wherein the data associated with the one or more first commands is written to a first portion of the first zone, and wherein a second portion of the first zone remains available to write data to. The controller is also configured to determine a first predetermined amount of time has passed since receiving a first command to write data to the first zone. The controller is further configured to open a second zone and write the data associated with the one or more second commands to a first portion of the second zone upon receiving one or more second commands to write data to the first zone. The controller is also configured to determine a second predetermined amount of time has passed since receiving a second command to write data to the first zone. The controller is further configured to open a third zone and write the data associated with the one or more third commands to a first portion of the third zone upon receiving one or more third commands to write data to the first zone. The controller is also configured to re-write the data associated with the one or more first commands written to the first portion of the first zone to a second portion of the third zone, and re-write the data associated with the one or more second commands written to the first portion of the second zone to a third portion of the third zone.

In another embodiment, a storage device comprises of a media unit, wherein a capacity of the media unit is divided into a plurality of zones. The media unit comprises a plurality of dies and each of the plurality of dies comprises a plurality of erase blocks. The storage device further comprises a controller coupled to the media unit. The controller is configured to write data associated with one or more first commands to a first portion of a first zone, and wherein a second portion of the first zone remains available to write data to. The controller is also configured to write dummy data to the second portion of the first zone to fill the first zone to a zone capacity. The controller is further configured to open a second zone and write the data associated with the one or more second commands to a first portion of the second zone upon receiving one or more second commands to write data to the first zone. The controller is also configured to re-write the data associated with the one or more first commands written to the first portion of the first zone to a second portion of the second zone. The controller is further configured to write dummy data to a third portion of the second zone to fill the second zone to a zone capacity upon the timer expiring a second time. The controller is also configured to open a third zone and write the data associated with the one or more third commands to a first portion of the third zone upon receiving one or more third commands to write data to the first zone. The controller is further configured to re-write the data associated with the one or more first commands written to the second portion of the second zone to a second portion of the third zone, and re-write the data associated with the one or more second commands written to the first portion of the second zone to a third portion of the third zone.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller and a media unit divided into a plurality of zones. Data associated with one or more first commands is written to a first portion of a first zone. Upon a predetermined amount of time passing, dummy data is written to a second portion of the first zone to fill the first zone to a zone capacity. Upon receiving one or more second commands to write data, a second zone is allocated and opened, and the data associated with the one or more second commands is written to a first portion of the second zone. The data associated with the one or more first commands is then optionally re-written to a second portion of the second zone to fill the second zone to a zone capacity, and the first zone is erased.

Figure 1:
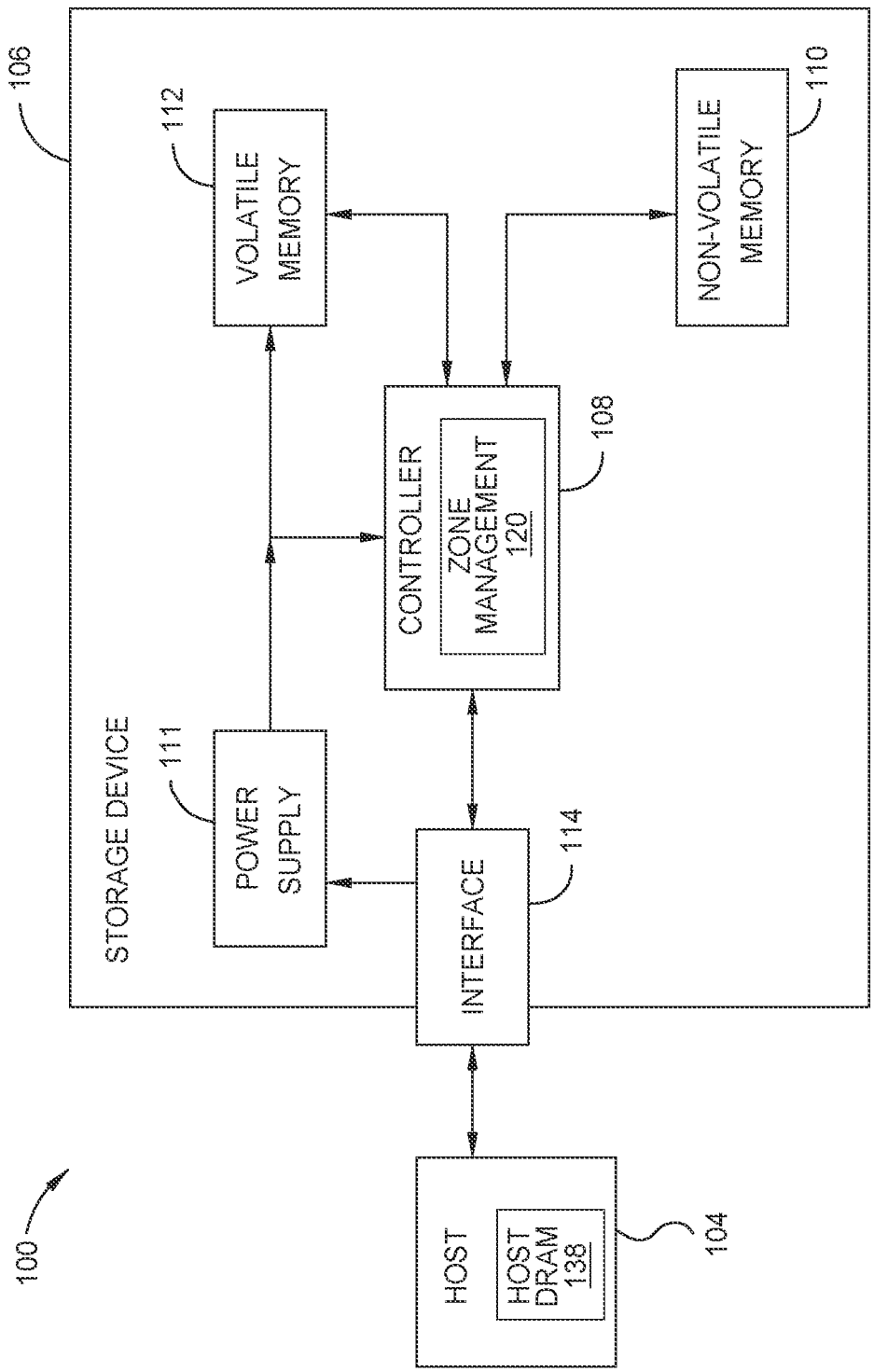
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize non-volatile memory devices 110 included in storage device 106 to store and retrieve data. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, non-volatile memory 110 (NVM 110), a power supply 111, volatile memory 112, and an interface 114. The controller 108 comprises an internal memory 120 or buffer. In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices or media units. NVM 110 may be configured to store and/or retrieve data. For instance, a media unit of NVM 110 may receive data and a message from the controller 108 that instructs the media unit to store the data. Similarly, the media unit of NVM 110 may receive a message from the controller 108 that instructs the media unit to retrieve data. In some examples, each of the media units may be referred to as a die. In some examples, a single physical chip may include a plurality of dies (i.e., a plurality of media units). In some examples, each media unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each media unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or media units. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, DDR5, LPDDR5, and the like)).

The storage device 106 includes a controller 108, which may manage one or more operations of the storage device 106. For instance, the controller 108 may manage the reading of data from and/or the writing of data to the NVM 110. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the storage device 106 receives a write command from the host device 104, the controller 108 temporarily stores the data associated with the write command in the internal memory 120 before sending the data to the NVM 110.

Figure 2:
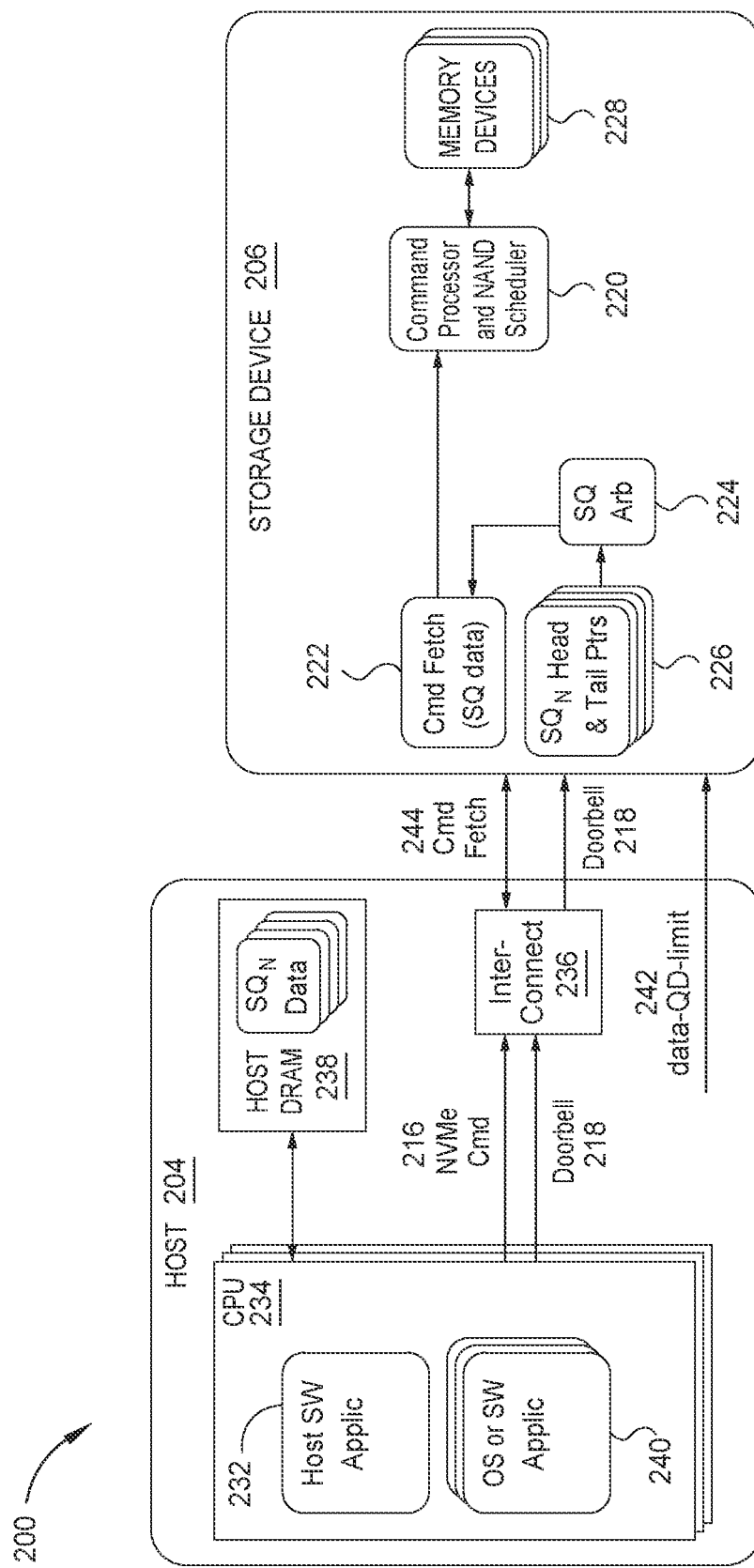
FIG. 2 illustrates a storage system comprising a storage device coupled to a host device, according to another embodiment.

FIG. 2 illustrates a storage system 200 comprising a storage device 206 coupled to a host device 204, according to another embodiment. Storage system 200 may be the storage system 100, the host device 104, and the storage device 106 of FIG. 1.

The storage device 206 may send and receive commands and data from the host device 204, and comprises a command processor 220. The command processor 220 may be the controller 108 of FIG. 1. The command processor 220 may schedule memory device access, such as NAND access, and may perform a read to a memory device prior to a previously received command requiring a write to the same memory device. The command processor 220 is coupled to one or more memory devices 228 and a command fetch 222. The one or more memory devices 228 may be NAND non-volatile memory devices. The command fetch 222 is coupled to a submission queue arbitration 224. The submission queue arbitration 224 is coupled to one or more submission queue head and tail pointers 226.

The host device 204 is comprised of one or more host software applications 232 coupled to one or more processing units or CPU applications 234. In one embodiment, the software application 232 has limited solid-state drive queue depth in order to derive a latency QoS for each user of the system 200. The host device 204 further comprises an operating system (OS) or software application 240 without an associated QoS. The CPU 234 is coupled to an interconnect 236 and to a host DRAM 238. The host DRAM 238 may store submission queue data. The interconnect 236 is coupled to the storage device 206. The interconnect 236 may be in communication with both the submission queue head and tail pointers 226 and the command fetch 222.

The CPU 234 generates one or more commands 216 to send to the storage device 206, and may send and receive commands from the storage device 206 via the command fetch signal 244. The CPU 234 may further send an interrupt or doorbell 218 to the storage device 206 to notify the storage device 206 of the one or more commands 216. The CPU 234 may limit data-queue depth submitted to the storage device 206. Queue depth (QD) is the maximum number of commands queued to the storage device 206, and data-QD is the amount of data associated with the commands queued with a QD. In one embodiment, the data-QD 242 of the storage device 206 is equal to the bandwidth of the storage device 206. Data-QD 242 is limited to the highest level under which the storage device 206 can still maintain a desired latency QoS. The command processor 220 then processes the commands received from the host device 204.

Figure 3:
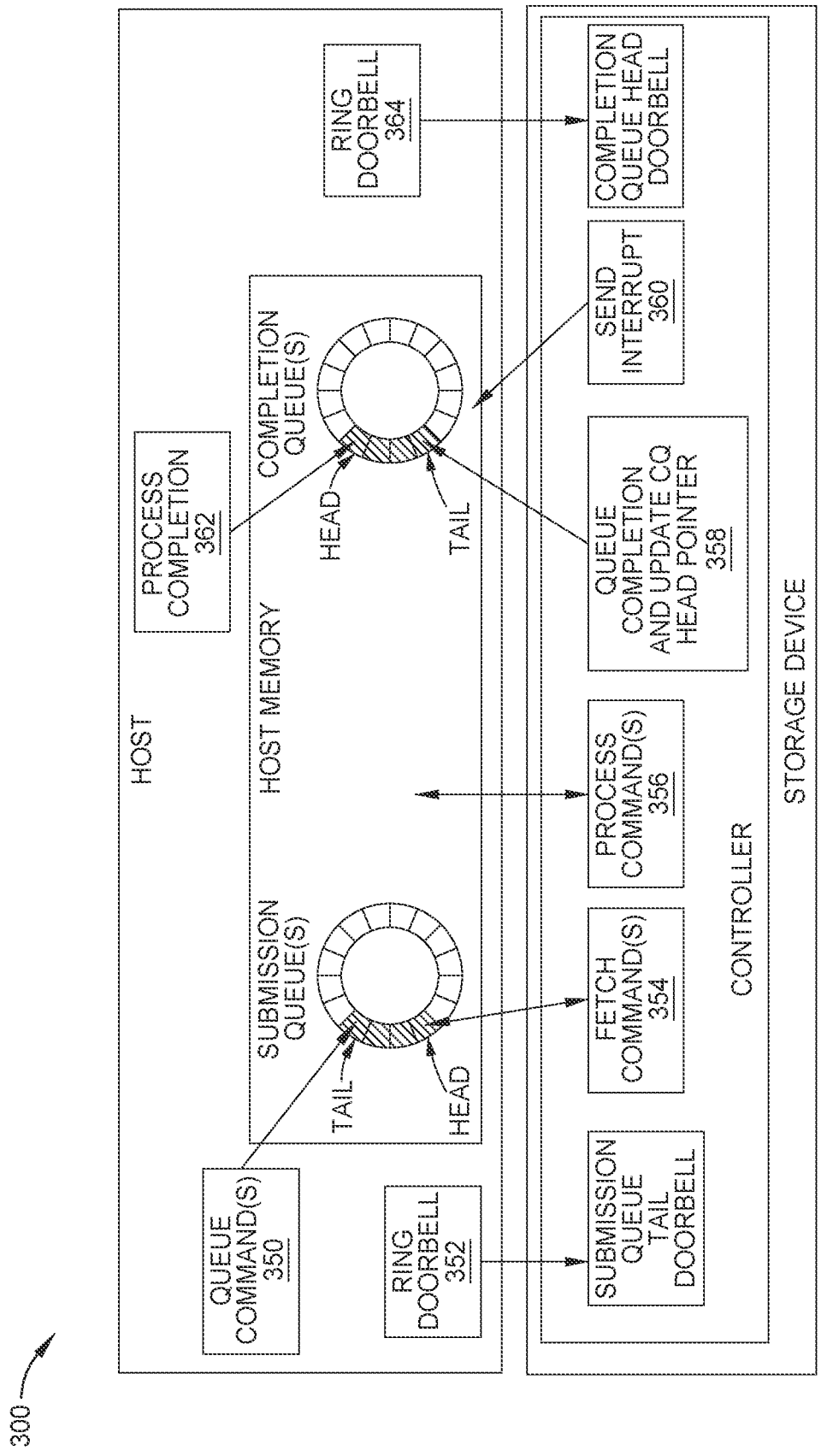
FIG. 3 is a block diagram illustrating a method of operating a storage device to execute a read or write command, according to one embodiment.

FIG. 3 is a block diagram illustrating a method 300 of operating a storage device to execute a read or write command, according to one embodiment. Method 300 may be used with the storage system 100 having a host device 104 and a storage device 106 comprising a controller 108. Method 300 may further be used with the storage system 200 having a host device 204 and a storage device 206 comprising a command processor 220.

Method 300 begins at operation 350, where the host device writes a command into a submission queue as an entry. The host device may write one or more commands into the submission queue at operation 350. The commands may be read commands or write commands. The host device may comprise one or more submission queues.

In operation 352, the host device writes one or more updated submission queue tail pointers and rings a doorbell or sends an interrupt signal to notify or signal the storage device of the new command that is ready to be executed. The doorbell signal may be the doorbell 218 of FIG. 2. The host may write an updated submission queue tail pointer and send a doorbell or interrupt signal for each of the submission queues if there are more than one submission queues. In operation 354, in response to receiving the doorbell or interrupt signal, a controller of the storage device fetches the command from the one or more submission queue, and the controller receives the command.

In operation 356, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 358, once the command has been fully processed, the controller writes a completion entry corresponding to the executed command to a completion queue of the host device and moves or updates the CQ head pointer to point to the newly written completion entry.

In operation 360, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 362, the host device processes the completion entry. In operation 364, the host device writes an updated CQ head pointer to the storage device and rings the doorbell or sends an interrupt signal to the storage device to release the completion entry.

Figure 4A:
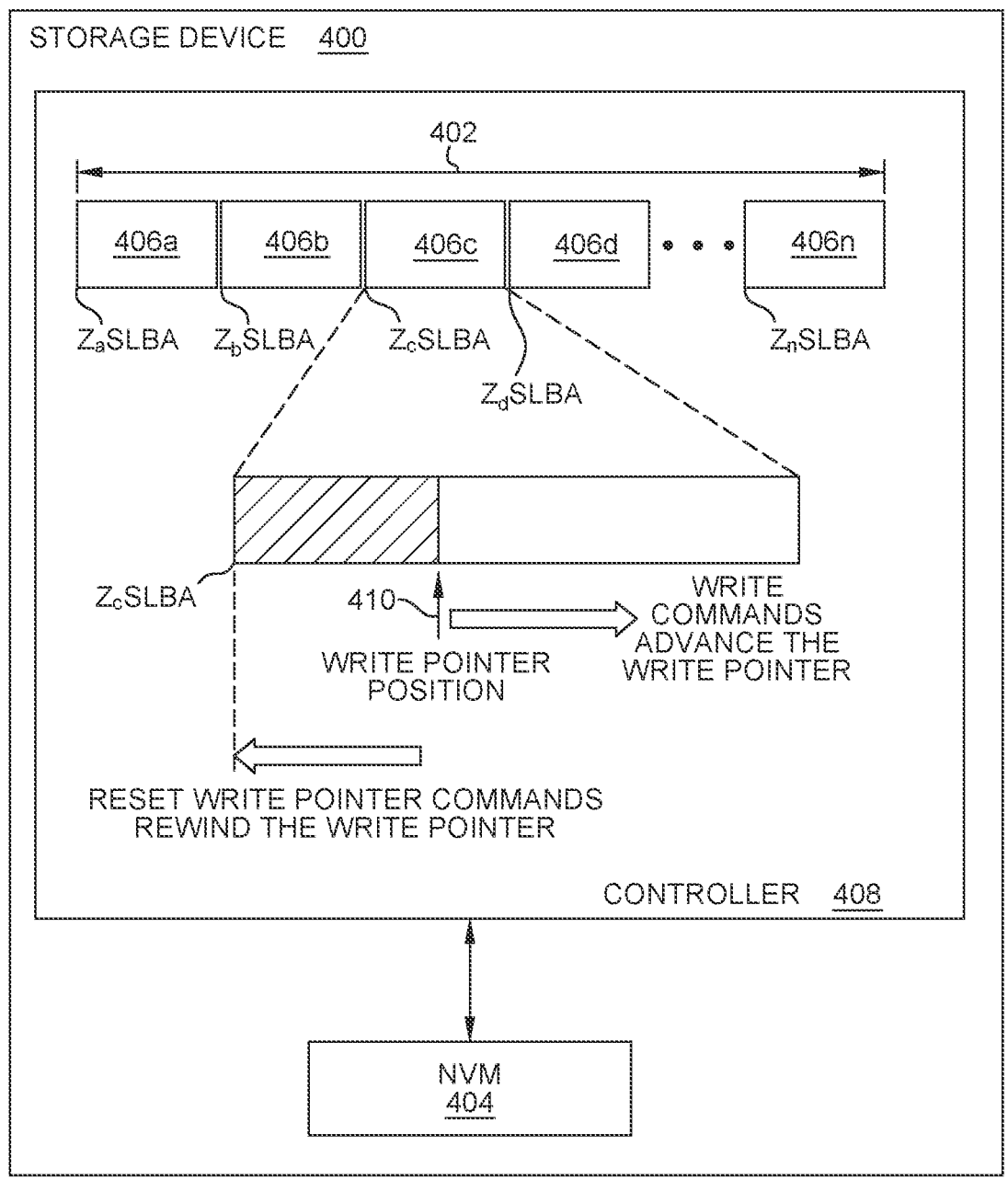
FIG. 4A illustrates a Zoned Namespaces view utilized in a storage device, according to one embodiment.
Figure 4B:
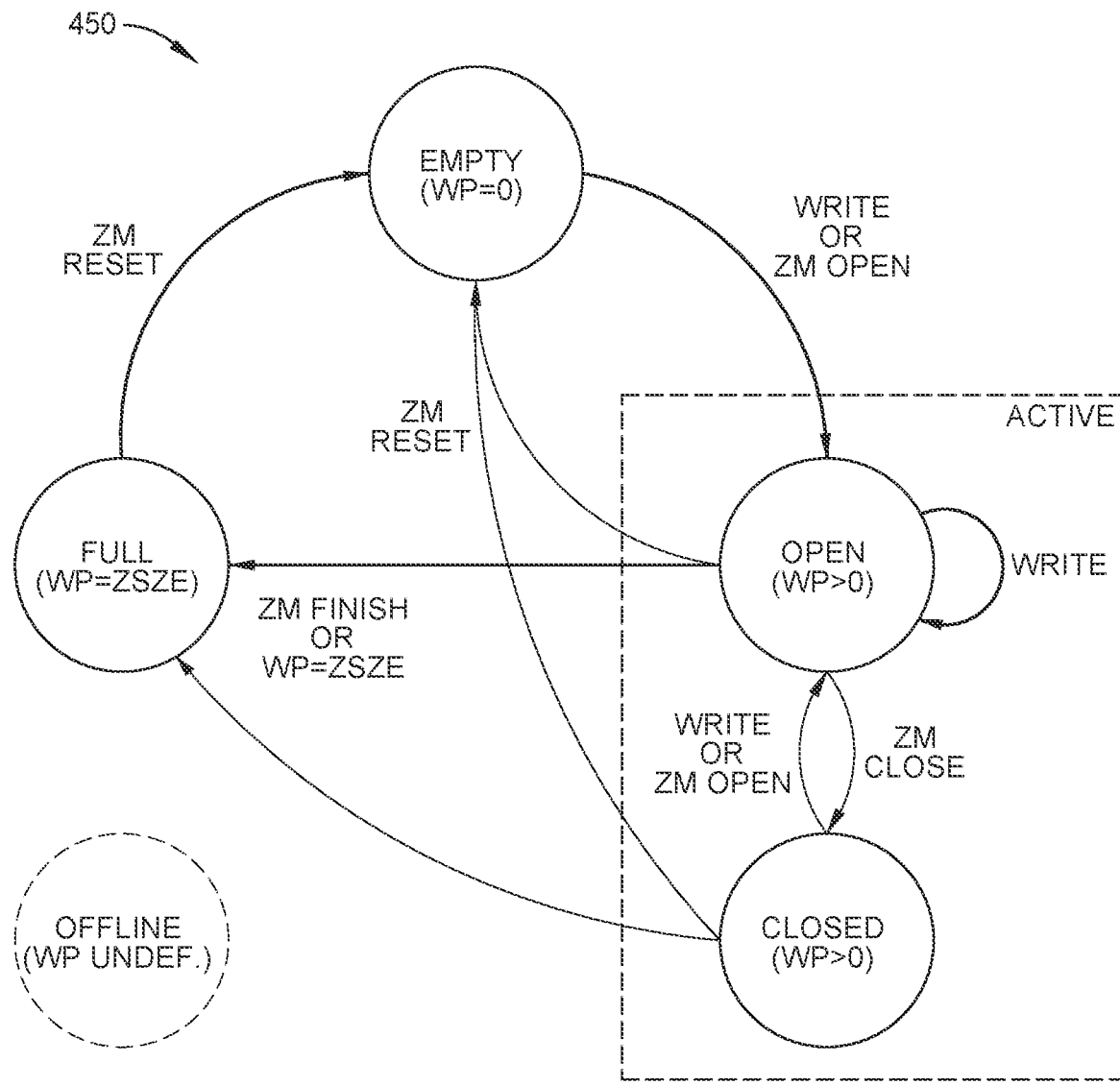
FIG. 4B illustrates a state diagram for the Zoned Namespaces of the storage device of FIG. 4A, according to one embodiment.

FIG. 4A illustrates a Zoned Namespaces (ZNS) 402 view utilized in a storage device 400, according to one embodiment. The storage device 400 may present the ZNS 402 view to a host device. FIG. 4B illustrates a state diagram 450 for the ZNS 402 of the storage device 400, according to one embodiment. The storage device 400 may be the storage device 106 of the storage system 100 of FIG. 1 or the storage device 206 of the storage system 200 of FIG. 2. The storage device 400 may have one or more ZNS 402, and each ZNS 402 may be different sizes. The storage device 400 may further comprise one or more conventional namespaces in addition to the one or more Zoned Namespaces 402. Moreover, the ZNS 402 may be a zoned block command (ZBC) for SAS and/or a zoned-device ATA command set (ZAC) for SATA. Host side zone activity may be more directly related to media activity in zoned drives due to the relationship of logical to physical activity possible.

In the storage device 400, the ZNS 402 is the quantity of NVM that can be formatted into logical blocks such that the capacity is divided into a plurality of zones 406a-406n (collectively referred to as zones 406). Each of the zones 406 comprise a plurality of physical or erase blocks (now shown) of a media unit or NVM 404, and each of the erase blocks are associated a plurality of logical blocks (not shown). When the controller 408 receives a command, such as from a host device (not shown) or the submission queue of a host device, the controller 408 can read data from and write data to the plurality of logical blocks associated with the plurality of erase blocks (EBs) of the ZNS 402. Each of the logical blocks is associated with a unique LBA or sector.

In one embodiment, the NVM 404 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to throughout, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as a non-limiting example.

When data is written to an erase block, one or more logical blocks are correspondingly updated within a zone 406 to track where the data is located within the NVM 404. Data may be written to one zone 406 at a time until a zone 406 is full, or to multiple zones 406 such that multiple zones 406 may be partially full. Similarly, when writing data to a particular zone 406, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

Each of the zones 406 is associated with a zone starting logical block address (ZSLBA). The ZSLBA is the first available LBA in the zone 406. For example, the first zone 406a is associated with $Z_a$SLBA, the second zone 406b is associated with $Z_b$SLBA, the third zone 406c is associated with $Z_c$SLBA, the fourth zone 406d is associated with $Z_d$SLBA, and the $n^{th}$ zone 406n (i.e., the last zone) is associated with $Z_n$SLBA. Each zone 406 is identified by its ZSLBA, and is configured to receive sequential writes (i.e., writing data to the NVM 110 in the order the write commands are received).

As data is written to a zone 406, a write pointer 410 is advanced or updated to point to or to indicate the next available block in the zone 406 to write data to in order to track the next write starting point (i.e., the completion point of the prior write equals the starting point of a subsequent write). Thus, the write pointer 410 indicates where the subsequent write to the zone 406 will begin. Subsequent write commands are 'zone append' commands, where the data associated with the subsequent write command appends to the zone 406 at the location the write pointer 410 is indicating as the next starting point. An ordered list of LBAs within the zone 406 may be stored for write ordering. Each zone 406 may have its own write pointer 410. Thus, when a write command is received, a zone 406 is identified by its ZSLBA, and the write pointer 410 determines where the write of the data begins within the identified zone 406.

FIG. 4B illustrates a state diagram 450 for the ZNS 402 of FIG. 4A. In the state diagram 450, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if a zone open command is issued by the host. Zone management (ZM) commands can be used to move a zone between zone open and zone closed states, which are both active states. If a zone is active, the zone comprises open blocks that may be written to, and the host may be provided a description of recommended time in the active state by the ZM or the controller. The controller may comprise the ZM.

The term "written to" includes programming user data on 0 or more word lines in an erase block, erasure, and/or partially filled word lines in an erase block when user data has not filled all of the available word lines. The term "written to" may further include closing a zone due to internal drive handling needs (open block data retention concerns because the bits in error accumulate more quickly on open erase blocks), the storage device 400 closing a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. New data pulled-in from the host device or valid data being relocated may be written to an open zone. Valid data may be moved from one zone (e.g. the first zone 402a) to another zone (e.g. the third zone 402c) for garbage collection purposes. A closed zone is an empty or partially full zone that is not currently receiving writes from the host in an ongoing basis. The movement of a zone from an open state to a closed state allows the controller 408 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). Read commands of data stored in full zones may still be executed.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an active zone. A zone may be erased any time between a ZM reset and a ZM open. An offline zone is a zone that is unavailable to write data to. An offline zone may be in the full state, the empty state, or in a partially full state without being active.

Since resetting a zone clears or schedules an erasure of the data stored in the zone, the need for garbage collection of individual erase blocks is eliminated, improving the overall garbage collection process of the storage device 400. The storage device 400 may mark one or more erase blocks for erasure. When a new zone is going to be formed and the storage device 400 anticipates a ZM open, the one or more erase blocks marked for erasure may then be erased. The storage device 400 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 410 for the zone 406 may be selected, enabling the zone 406 to be tolerant to receive commands out of sequential order. The write pointer 410 may optionally be turned off such that a command may be written to whatever starting LBA is indicated for the command.

Referring back to FIG. 4A, when the host sends a write command to write data to a zone 406, the controller 408 pulls-in the write command and identifies the write command as a write to a newly opened zone 406. The controller 408 selects a set of EBs to store the data associated with the write commands of the newly opened zone 406 to, and the newly opened zone 406 switches to an active zone 406. As used herein, the controller 408 initiating, receiving, or pulling-in a write command comprises receiving a write command or direct memory access (DMA) reading the write command. The write command may be a command to write new data, or a command to move valid data to another zone for garbage collection purposes. The controller 408 is configured to DMA read new commands from a submission queue populated by a host device.

In an empty zone 406 just switched to an active zone 406, the data is written to the zone 406 starting at the ZSLBA, as the write pointer 410 is indicating the logical block associated with the ZSLBA as the first available logical block. The data may be written to one or more erase blocks or NAND locations that have been allocated for the physical location of the zone 406. After the data associated with the write command has been written to the zone 406, the write pointer 410 is updated to point to the next available block in the zone 406 to track the next write starting point (i.e., the completion point of the first write). Alternatively, the controller 408 may select an active zone to write the data to. In an active zone, the data is written to the logical block indicated by the write pointer 410 as the next available block.

For example, the controller 408 may receive or pull-in a first write command to a third zone 406c, or a first zone append command. The host identifies sequentially which logical block of the zone 406 to write the data associated with the first command to. The data associated with the first command is then written to the first or next available LBA(s) in the third zone 406c as indicated by the write pointer 410, and the write pointer 410 is advanced or updated to point to the next available LBA available for a host write (i.e., WP>0). If the controller 408 receives or pulls-in a second write command to the third zone 406c, the data associated with the second write command is written to the next available LBA(s) in the third zone 406c identified by the write pointer 410. Once the data associated with the second command is written to the third zone 406c, the write pointer 410 once again advances or updates to point to the next available LBA available for a host write. Resetting the zone 406c moves the write pointer 410 back to the $Z_c$SLBA (i.e., WP=0), and the zone 406c switches to an empty zone.

Figure 5A:
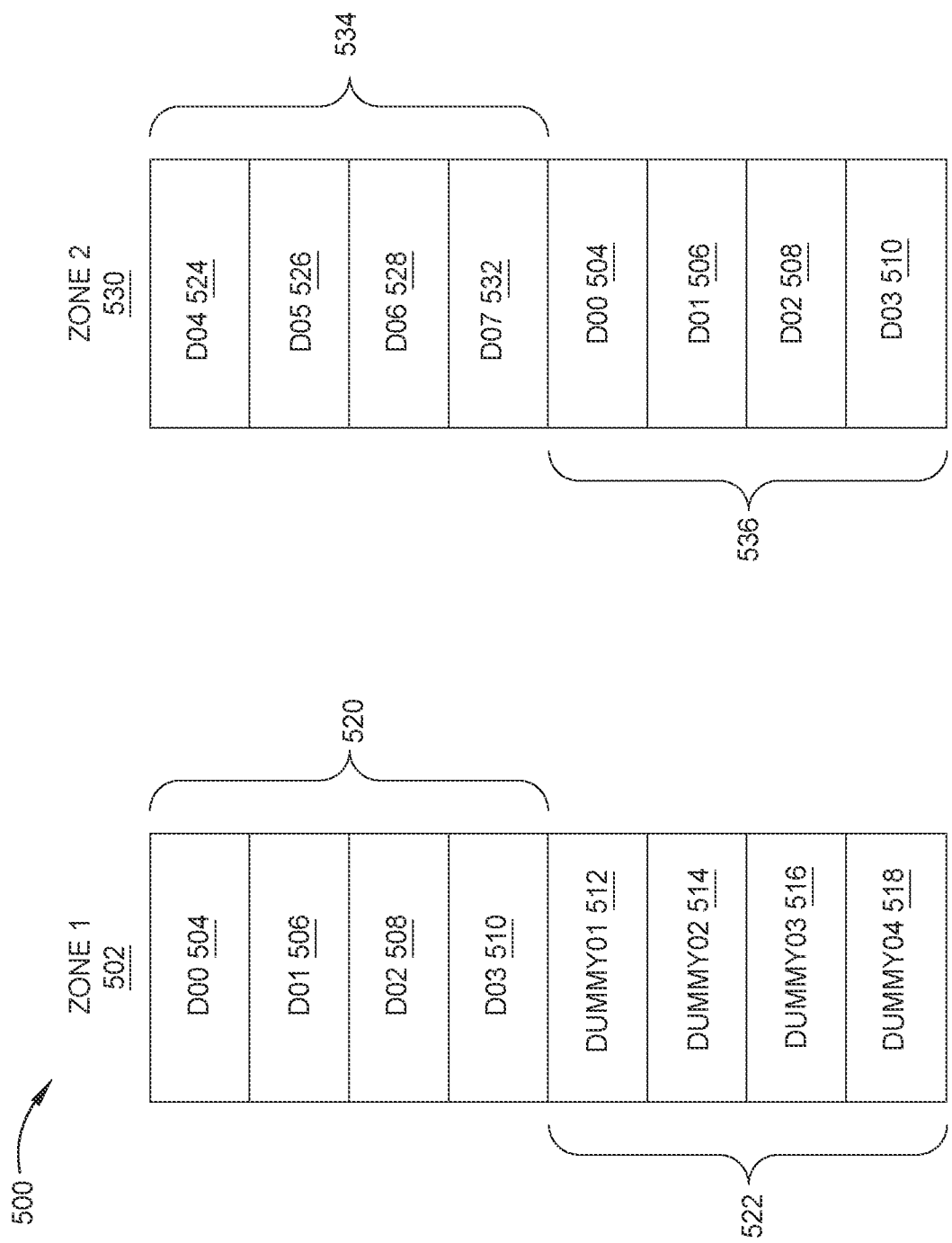
FIG. 5A is a schematic illustration of a ZNS of a storage device storing data, according to one embodiment.
Figure 5B:
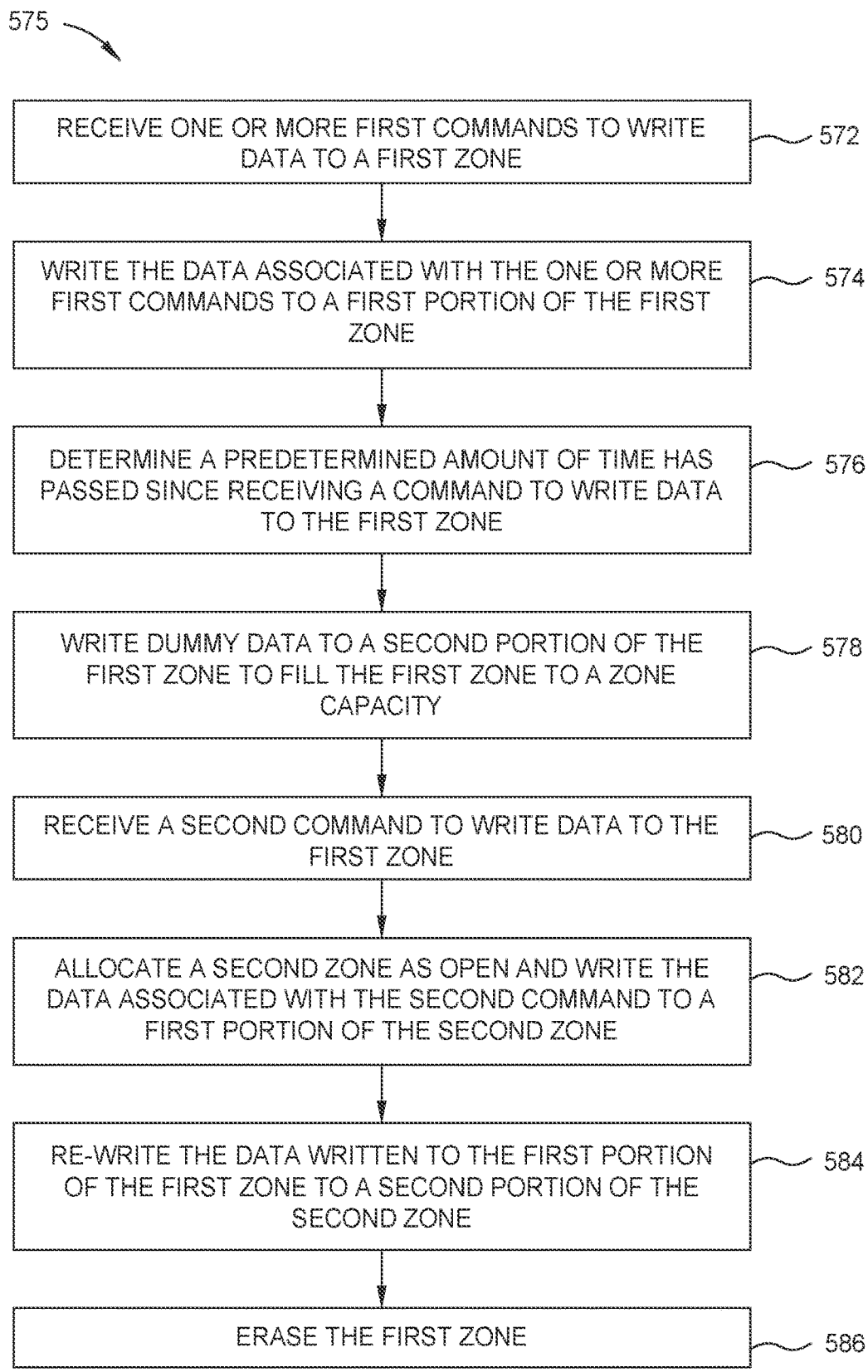
FIG. 5B is a flowchart illustrating a method of writing data to the ZNS of FIG. 5A, according to one embodiment.

FIG. 5A is a schematic illustration of a ZNS 500 of a storage device for storing data, according to one embodiment. FIG. 5B is a flowchart illustrating a method 575 of writing data to the ZNS 500 of FIG. 5A, according to one embodiment. The storage device (not shown) may be the storage device 106 of FIG. 1, the storage device 206 of FIG. 2, or the storage device 400 of FIG. 4A. The controller of the storage device may be the controller 108 of FIG. 1 or the controller 408 of FIG. 4A. The ZNS 500 may be the ZNS 402 of FIGS. 4A-4B. The ZNS 500 comprises a plurality of zones. For example, a first Zone 1 502 and a second Zone 2 530 are shown. As discussed above, each zone 502, 530 of the ZNS 500 may comprise any number of erase blocks. For example, each zone 502, 530 is shown to comprise 8 erase blocks, but may comprise additional or fewer erase blocks, such as 64 erase blocks from 32 die that each possess 2 planes. Additionally, each zone of the plurality of zones may have the same zone capacity (i.e., the amount of writeable capacity for storing data). Zones are an interface descriptive entity and may have no implications on the physical NAND activity. Additionally, the relationship of zones to physical NAND activity is not required. Therefore, the separation of logical host interface activity to physical device activity may be an advantage for the efficiency of a storage device.

In the following figures and corresponding description, data is denoted by "Dxx" where "x" represents a write ID of an associated command. Furthermore, pad data or dummy data is denoted by "DUMMYxx" where "x" represents a pad or a dummy write ID. The method 575 of FIG. 5B will be described with reference to the ZNS 500 of FIG. 5A. In FIGS. 5A-7B, the term "DUMMY" data may refer to any data entered to pad a zone to the zone capacity. Dummy data or pad data may be any set of data that the controller recognizes is not user data, XOR or parity data, metadata, or any other usable data not listed. Some options of dummy data or pad data are sets of 0s, sets of 1s, sentinel values specifically chosen to have a meaning (i.e., to be used for dummy data or pad data), for example, internal drive code for "unwritten data", randomly written data, or any of the previously listed through a scrambling or encryption algorithm. The various options for dummy data or pad data may be used as an added debugging capability.

At block 572, the storage device, such as a controller of the storage device, receives one or more first commands to write data D00 504, D01 506, D02 508, D03 510 to the first zone 502 from a host, such as the host 204 of FIG. 2. At block 574, the data associated with the one or more first commands D00 504, D01 506, D02 508, D03 510 is then written to a first portion 520 of the first zone 502. At block 576, the controller determines that a predetermined amount of time has passed since receiving a command to write data to the first zone 502. At block 578, the second portion 522 of the first zone 502 that is currently empty is then temporarily filled with a pad or dummy data set DUMMY01 512, DUMMY02 514, DUMMY03 516, DUMMY04 518 to fill the first zone 502 to a zone capacity. Filling the first zone 502 with the dummy data DUMMY01 512, DUMMY02 514, DUMMY03 516, DUMMY04 518 switches the first zone 502 to the closed and active state. The term "DUMMY" data may refer to any data entered to pad the first zone 502 to the zone capacity, as discussed above.

The controller of the storage device may comprise a timer or other mechanism to determine that the predetermined amount of time has passed or expired (e.g., to time or track the amount of time that a zone has been in the open state). The timer may be configured to expire after the predetermined amount of time to trigger the padding of a zone due to a previously characterized exposure risk of open EB time to bit error accumulation. The relationship of EB open time to previously accumulated programmed bit error accumulation may or may not be a function of opened EB time (i.e., may be the time from erased EB to fully programmed EB). The predetermined amount of time may be based off the type of flash storage of the first zone 502 (e.g., SLC, MLC, TLC, QLC, or other iterations of multi-level cells). For example, the predetermined amount of time for QLC may be in the range of, but not limited to, about 15 minutes to about three days. In another example, TLC may have a predetermined amount of time of, but not limited to, about one day to about seven days. Thus, the predetermined amount of time may be between about 15 minutes to about seven days or more. These predetermined times may incorporate a threshold of acceptable bit error rate accumulation during the time the EB is in a partially filled state. The predetermined times may incorporate increased levels of complexity such as characterizing different lengths of time for different quantities of partially written data in the EB. Such predetermined amounts of time should not be taken as limiting, but as generally accepted by the industry.

If the first zone 502 is not filled after the predetermined amount of time passes or expires, data reliability may decrease due to the open state of the first zone 502. Exposure of data in a zone in an open state may potentially lead to the accumulation of erroneous bits. The accumulation of erroneous bits may potentially lead to a loss in data in the zone. The decreased time a zone is left in the open and active state may reflect in a greater reliability of the NVM.

At block 580, the storage device receives one or more second commands to write data D04 524, D05 526, D06 528, D07 532 to the first zone 502 from the host device. At block 582, a second zone 530 is then allocated and opened when the one or more second commands are received since the first zone 502 is at the zone capacity. If the second zone 530 is currently storing old or outdated data, the erase blocks in the second zone 530 may be erased prior to writing the data associated with the one or more second commands D04 524, D05 526, D06 528, D07 532. The data associated with the one or more second commands D04 524, D05 526, D06 528, D07 532 is then written to a first portion 534 of the second zone 530.

At block 584, the data associated with the one or more first commands D00 504, D01 506, D02 508, D03 510 is re-written to a second portion 536 of the second zone 530. Thus, the second zone 530 is filled to a zone capacity with the data associated with the one or more first commands D00 504, D01 506, D02 508, D03 510 and the data associated with the one or more second commands D04 524, D05 526, D06 528, D07 532.

Upon re-writing the data associated with the one or more first commands D00 504, D01 506, D02 508, D03 510 to the second portion 536 of the second zone 530, the first zone 502 can be erased at block 586. The first Zone 1 502 may then be allocated back into the available resource pool. The end result is the second Zone 2 530 being filled to the zone capacity.

Figure 6A:
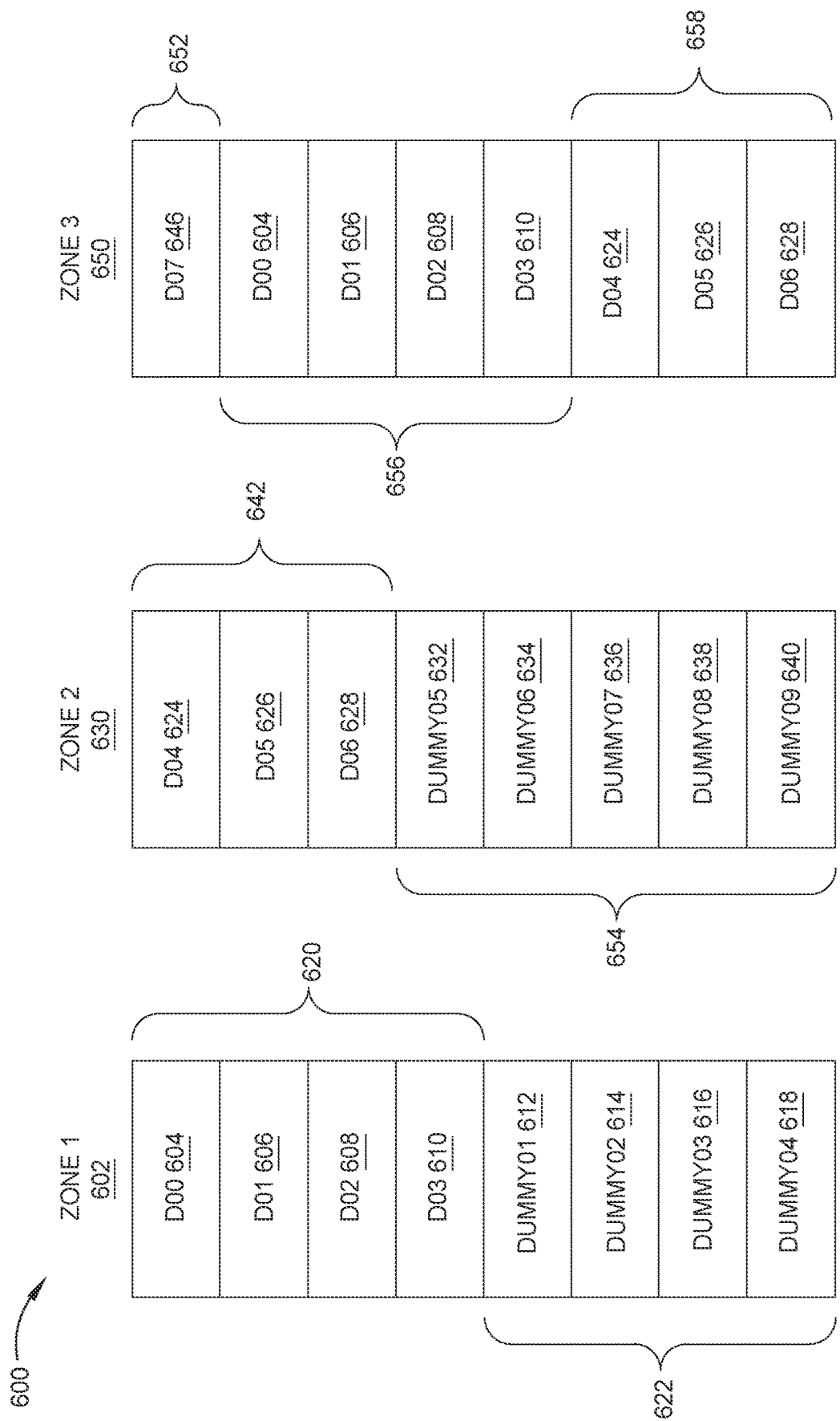
FIG. 6A is a schematic illustration of a ZNS of a storage device storing data, according to another embodiment.
Figure 6B:
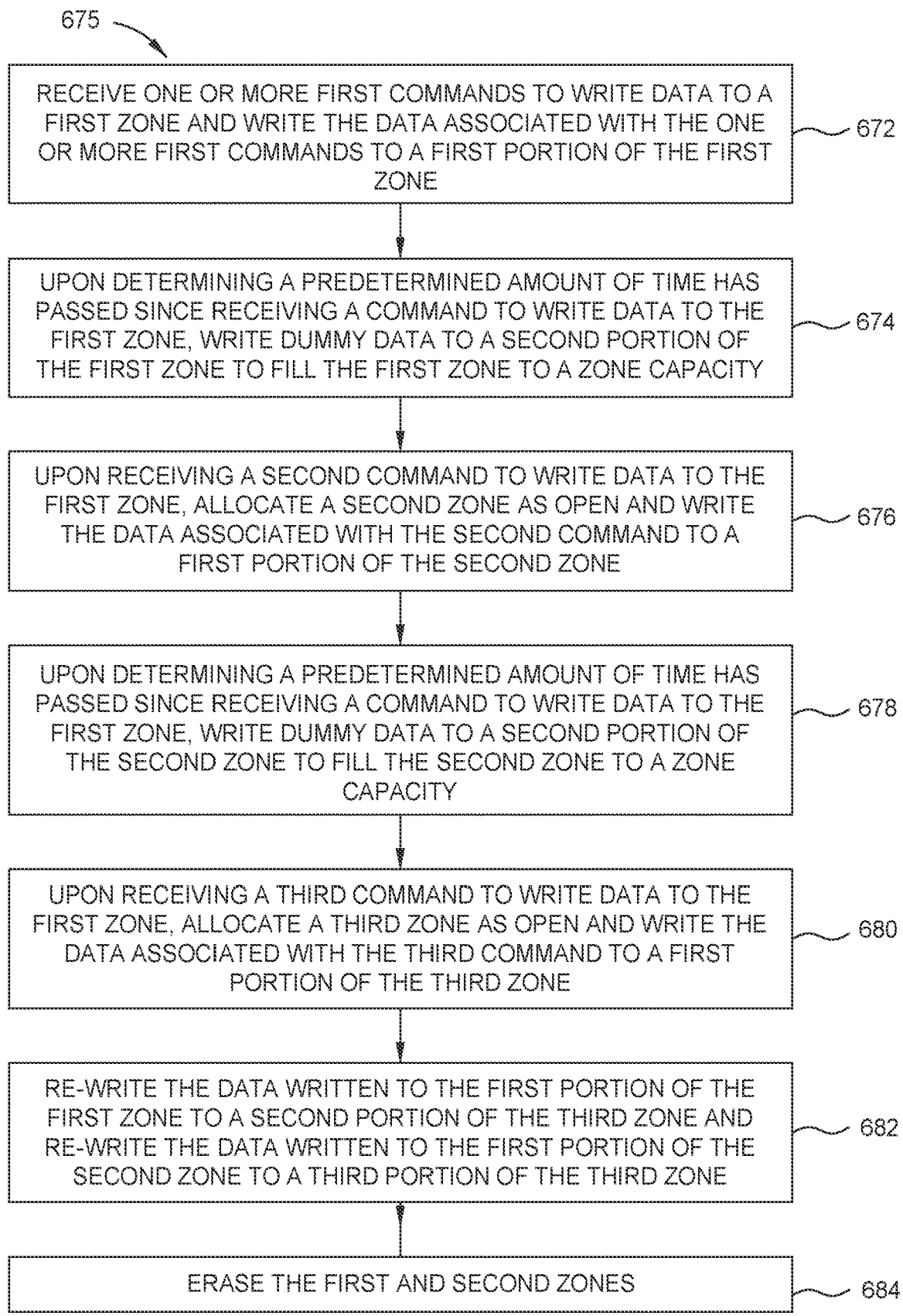
FIG. 6B is a flowchart illustrating a method of writing data to the ZNS of FIG. 6A, according to one embodiment.

FIG. 6A is a schematic illustration of a ZNS 600 of a storage device for storing data, according to another embodiment. FIG. 6B is a flowchart illustrating a method 675 of writing data to the ZNS 600 of FIG. 6A, according to one embodiment. The storage device (not shown) may be the storage device 106 of FIG. 1, the storage device 206 of FIG. 2, or the storage device 400 of FIG. 4A. The controller of the storage device may be the controller 108 of FIG. 1 or the controller 408 of FIG. 4A. The ZNS 600 may be the ZNS 402 of FIGS. 4A-4B. The ZNS 600 comprises a plurality of zones. For example, a first Zone 1 602, a second Zone 2 630, and a third Zone 3 650 are shown. As discussed above, each zone 602, 630, 650 is shown to comprise 8 erase blocks, but may comprise additional or fewer erase blocks, such as 64 erase blocks from 32 die that each possess 2 planes. Additionally, each zone of the plurality of zones may have the same zone capacity (i.e., the amount of writeable capacity for storing data). The method 675 of FIG. 6B will be described with reference to the ZNS 600 of FIG. 6A.

At block 672, the storage device, such as a controller of the storage device, receives one or more first commands to write data D00 604, D01 606, D02 608, D03 610 to the first zone 602 from a host, such as the host 204 of FIG. 2. The data associated with one or more first commands D00 604, D01 606, D02 608, D03 610 is then written to a first portion 620 of the first zone 602. At block 674, the controller determines that a predetermined amount of time has passed since receiving a command to write data to the first zone 602. The second portion 622 of the first zone 602 that is currently empty is then temporarily filled with a pad or dummy data set DUMMY01 612, DUMMY02 614, DUMMY03 616, DUMMY04 618 to fill the first zone 602 to a zone capacity. Filling the first zone 602 with the dummy data DUMMY01 612, DUMMY02 614, DUMMY03 616, DUMMY04 618 switches the first zone 602 to the closed and active state. The term "DUMMY" data may refer to any data entered to pad a zone to the zone capacity, as discussed above.

The controller of the storage device may comprise a timer or other mechanism to determine that the predetermined amount of time has passed or expired (e.g., to time or track the amount of time that a zone has been in the open state). The timer may be configured to expire after the predetermined amount of time to trigger the padding of a zone due to a previously characterized exposure risk of open EB time to bit error accumulation. The relationship of EB open time to previously accumulated programmed bit error accumulation may or may not be a function of opened EB time (i.e., the time from erased EB to fully programmed EB). The predetermined amount of time may be based off the type of flash storage of the first zone 602 (e.g., SLC, MLC, TLC, QLC, or other iterations of multi-level cells), such as between about 15 minutes to about seven days or more. These predetermined times may incorporate a threshold of acceptable bit error rate accumulation during the time the EB is in a partially filled state. The predetermined times may incorporate increased levels of complexity such as characterizing different lengths of time for different quantities of partially written data in the EB. Such predetermined amounts of time should not be taken as limiting, but as generally accepted by the industry.

If the first zone 602 is not filled after the predetermined amount of time passes or expires, data reliability may decrease due to the open state of the first zone 602. Exposure of data in a zone in an open state may potentially lead to the accumulation of erroneous bits. The accumulation of erroneous bits may potentially lead to a loss in data in the zone. The decreased time a zone is left in the open and active state may reflect in a greater reliability of the NVM.

At block 676, the storage device receives one or more second commands to write data D04 624, D05 626, D06 628 to the first zone from the host device. A second zone 630 is then allocated and opened when the one or more second commands are received since the first zone 602 is at the zone capacity. If the second zone 630 is currently storing old or outdated data, the erase blocks in the second zone 630 may be erased prior to writing the data associated with one or more second commands D04 624, D05 626, D06 628. The data associated with the one or more second commands D04 624, D05 626, D06 628 is then written to a first portion 642 of the second zone 630.

At block 678, the controller determines that a predetermined amount of time has passed since receiving a command to write data to the first or second zones 602, 630. In one embodiment, the predetermined amount of time at block 674 is the same as the predetermined amount of time at block 678. In another embodiment, the predetermined amount of time at block 674 is different than the predetermined amount of time at block 678. The second portion 654 of the second zone 630 that is currently empty is then temporarily filled with a pad data set DUMMY05 632, DUMMY06 634, DUMMY07 636, DUMMY08 638, DUMMY09 640 to fill the second zone 630 to a zone capacity. Filling the second zone 630 with the dummy data DUMMY05 632, DUMMY06 634, DUMMY07 636, DUMMY08 638, DUMMY09 640 switches the second zone 630 to the closed and active state.

At block 680, the storage device receives one or more third commands to write data D07 646 to the first zone 602 from the host device. A third zone 650 is then allocated and opened when the one or more third commands are received since the first zone 602 and the second zone 630 are both filled to their respective zone capacities. If the third zone 650 is currently storing old or outdated data, the erase blocks in the third zone 650 may be erased prior to writing the data associated with one or more third commands D07 646. The data associated with the one or more third commands D07 646 is then written to a first portion 652 of the third zone 650.

At block 682, the data associated with the one or more first commands D00 604, D01 606, D02 608, D03 610 is optionally re-written to a second portion 656 of the third zone 650, and the data associated with one or more second commands D04 624, D05 626, D06 628 is re-written to a third portion 658 of the third zone 650. However, the data written to the third zone 650 may be stored in a non-sequential order (i.e., the data associated with the one or more third commands D07 646 is stored first while the data associated with the one or more second commands D04 624, D05 626, D06 628 is stored last). The DRAM, such as the volatile memory 112 of FIG. 1, comprises a logical to physical (L2P) translation table that may track the out of order data (e.g., utilizing pointers). In another embodiment, the tracking of the data order may be in the metadata written to the physical media at a predetermined location. Thus, the third zone 650 is filled to a zone capacity with the data associated with the one or more first commands D00 604, D01 606, D02 608, D03 610, the data associated with one or more second commands D04 624, D05 626, D06 628, and the data associated with one or more third commands D07 646.

Upon optionally re-writing the data associated with the one or more first commands D00 604, D01 606, D02 608, D03 610 to the second portion 656 of the third zone 650, the first zone 602 can be erased at block 586. Upon re-writing the data associated with one or more second commands D04 624, D05 626, D06 628 to the third portion 658 of the third zone 650, the second zone 630 can be erased at block 684. The erased first zone 602 and second zone 630 may be allocated back to the available resource pool. The end result is the third Zone 3 650 being filled to the zone capacity.

Figure 7A:
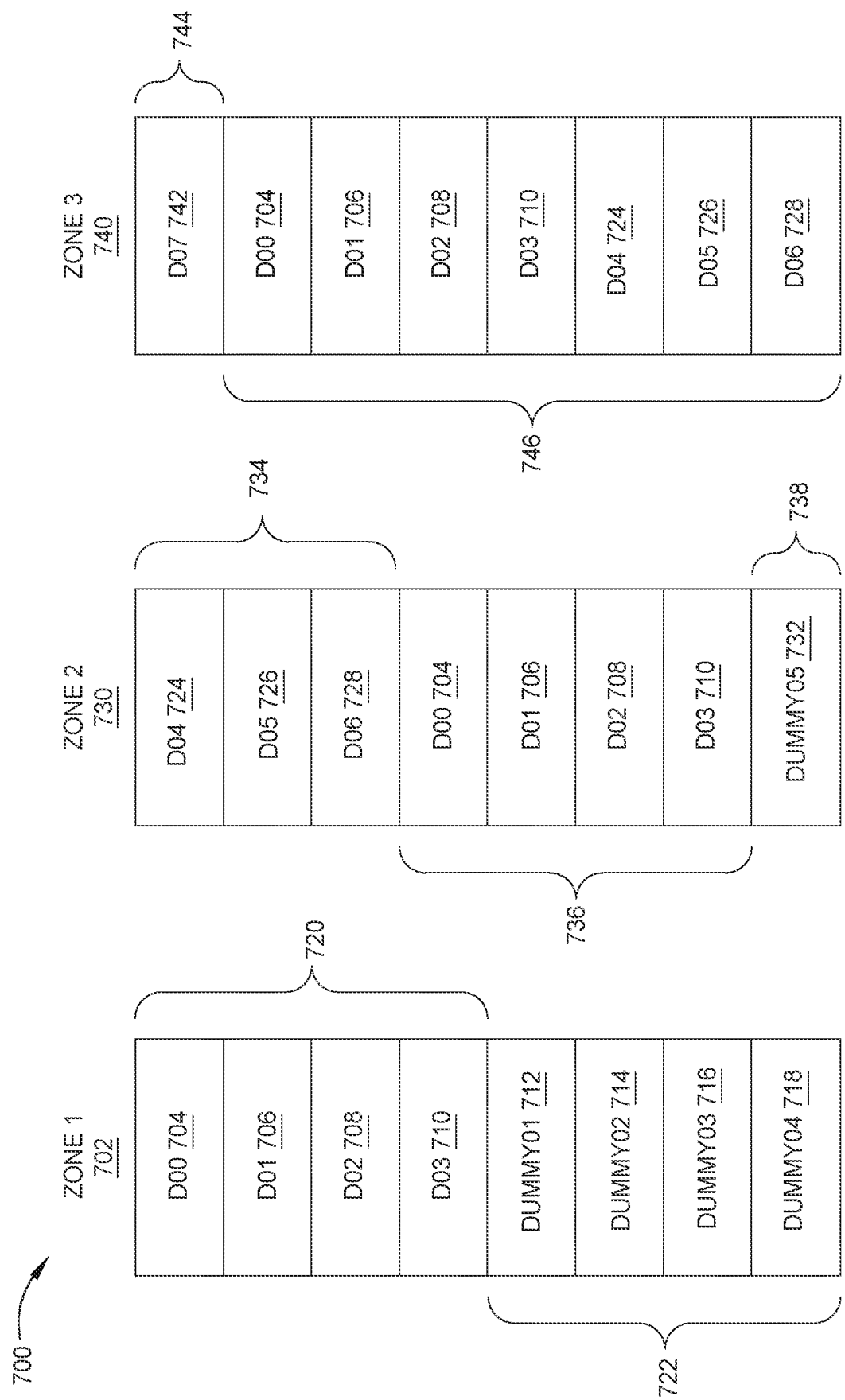
FIG. 7A is a schematic illustration of a ZNS of a storage device storing data, according to yet another embodiment.
Figure 7B:
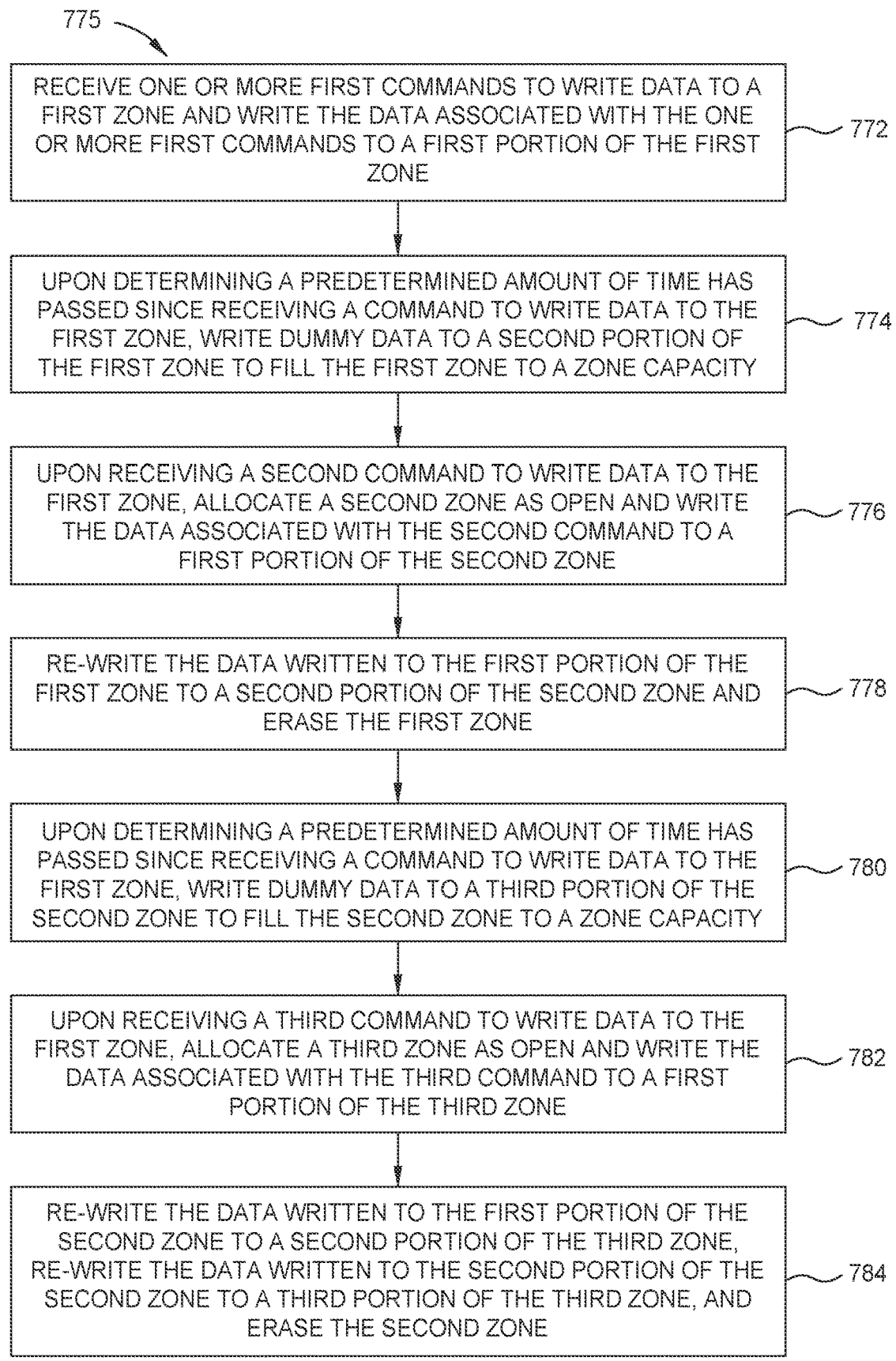
FIG. 7B is a flowchart illustrating a method of writing data to the ZNS of FIG. 7A, according to one embodiment.

FIG. 7A is a schematic illustration of a ZNS 700 of a storage device for storing data, according to another embodiment. FIG. 7B is a flowchart illustrating a method 775 of writing data to the ZNS 700 of FIG. 7A, according to one embodiment. The storage device (not shown) may be the storage device 106 of FIG. 1, the storage device 206 of FIG. 2, or the storage device 400 of FIG. 4A. The controller of the storage device may be the controller 108 of FIG. 1 or the controller 408 of FIG. 4A. The ZNS 700 may be the ZNS 402 of FIGS. 4A-4B. The ZNS 700 comprises a plurality of zones. For example, a first Zone 1 702, a second Zone 2 730, and a third Zone 3 740 are shown. As discussed above, each zone 702, 730, 740 is shown to comprise 8 erase blocks, but may comprise additional or fewer erase blocks such as 64 erase blocks from 32 die that each possess 2 planes. Additionally, each zone of the plurality of zones may have the same zone capacity (i.e., the amount of writeable capacity for storing data). The method 775 of FIG. 7B will be described with reference to the ZNS 700 of FIG. 7A.

At block 772, the storage device, such as a controller of the storage device, receives one or more first commands to write data D00 704, D01 706, D02 708, D03 710 to the first zone 702 from a host, such as the host 204 of FIG. 2. The data associated with one or more first commands D00 704, D01 706, D02 708, D03 710 is then written to a first portion 720 of the first zone 702. At block 774, the controller determines that a predetermined amount of time has passed since receiving a command to write data to the first zone 702. The second portion 722 of the first zone 702 that is currently empty is then temporarily filled with a pad or dummy data set DUMMY01 712, DUMMY02 714, DUMMY03 716, DUMMY04 718 to fill the first zone 702 to a zone capacity. Filling the first zone 702 with the dummy data DUMMY01 712, DUMMY02 714, DUMMY03 716, DUMMY04 718 switches the first zone 702 to the closed and active state. The term "DUMMY" data may refer to any data entered to pad a zone to the zone capacity, as discussed above.

The controller of the storage device may comprise a timer or other mechanism to determine that the predetermined amount of time has passed or expired (e.g., to time or track the amount of time that a zone has been in the open state). The timer may be configured to expire after the predetermined amount of time to trigger the padding of a zone due to a previously characterized exposure risk of open EB time to bit error accumulation. The relationship of EB open time to previously accumulated programmed bit error accumulation may or may not be a function of opened EB time (i.e., the time from erased EB to fully programmed EB). The predetermined amount of time may be based off the type of flash storage of the first zone 702 (e.g., SLC, MLC, TLC, QLC, or other iterations of multi-level cells), such as between about 15 minutes to about seven days. These predetermined times may incorporate a threshold of acceptable bit error rate accumulation during the time the EB is in a partially filled state. The predetermined times may incorporate increased levels of complexity such as characterizing different lengths of time for different quantities of partially written data in the EB. Such predetermined amounts of time should not be taken as limiting, but as generally accepted by the industry.

If the first zone 702 is not filled after the predetermined amount of time passes or expires, data reliability may decrease due to the open state of the first zone 702. Exposure of data in a zone in an open state may potentially lead to the accumulation of erroneous bits. The accumulation of erroneous bits may potentially lead to a loss in data in the zone. The decreased time a zone is left in the open and active state may reflect in a greater reliability of the NVM.

At block 776, the storage device receives one or more second commands to write data D04 724, D05 726, D06 728 to the first zone 702 from the host. A second zone 730 is then allocated and opened when the one or more second commands are received since the first zone 702 is filled. If the second zone 730 is currently storing old or outdated data, the erase blocks in the second zone 730 may be erased prior to writing the data associated with the one or more second commands D04 724, D05 726, D06 728. The data associated with the one or more second commands D04 724, D05 726, D06 728 is then written to a first portion 734 of the second zone 730.

At block 778, the data associated with the one or more first commands D00 704, D01 706, D02 708, D03 710 is optionally re-written to a second portion 736 of the second zone 730. Upon optionally re-writing the data associated with the one or more first commands D00 704, D01 706, D02 708, D03 710 to the second portion 736 of the second zone 730, the first zone 702 can be erased at block 778. The erased first zone 702 may be allocated back to the available resource pool.

At block 780, the controller determines that a predetermined amount of time has passed since receiving a command to write data to the first or second zones 702, 730. In one embodiment, the predetermined amount of time at block 774 is the same as the predetermined amount of time at block 780. In another embodiment, the predetermined amount of time at block 774 is different than the predetermined amount of time at block 780. The third portion 738 of the second zone 730 that is currently empty is then temporarily filled with a pad or dummy data set DUMMY05 732 to fill the second zone 730 to a zone capacity. The end result is a second Zone 2 730 filled to the zone capacity. Filling the second zone 730 with the dummy data DUMMY05 732 switches the second zone 730 to the closed and active state.

At block 782, the storage device receives one or more third commands to write data D07 742 to the first zone 702. A third zone 740 is then allocated and opened when the one or more third commands are received since the first zone 702 has been erased and the second zone 730 is filled to the zone capacity. If the third zone 740 is currently storing old or outdated data, the erase blocks in the third zone 740 may be erased prior to writing the data associated with one or more third commands D07 742. The data associated with the third command D07 742 is then written to a first portion 744 of the third zone 740.

At block 784, the data associated with the one or more first commands D00 704, D01 706, D02 708, D03 710 that has been re-written to the second portion 736 of the second zone 730 and the data associated with one or more second commands D04 724, D05 726, D06 728 that has been written to the first portion 734 of the second zone 730 are optionally re-written to the second portion 746 of the third zone 740. However, the data written to the third zone 740 may be stored in a non-sequential order (i.e., the data associated with the one or more third commands D07 742 is stored first while the data associated with the one or more second commands D04 724, D05 726, D06 728 is stored last). The DRAM, such as the volatile memory 112 of FIG. 1, comprises a logical to physical (L2P) translation table that may track the out of order data (e.g., utilizing pointers). In another embodiment, the tracking of the data order may be in the metadata written to the physical media at a predetermined location. Thus, the third zone 740 is filled to a zone capacity with the data associated with the one or more first commands D00 704, D01 706, D02 708, D03 710, the data associated with one or more second commands D04 724, D05 726, D06 728, and the data associated with one or more third commands D07 742.

Upon optionally re-writing the data associated with the one or more first commands D00 704, D01 706, D02 708, D03 710 and the data associated with one or more second commands D04 724, D05 726, D06 728 to the second portion 746 of the third zone 740, the second zone 730 can be erased at block 784. The erased second zone 730 may be allocated back to the available resource pool. The end result is a third Zone 3 740 filled to the zone capacity.

Zones exist in an open state due to having available erase blocks for data writes. A zone being in the open state for a prolonged amount of time may potentially lead to a decrease of data reliability due to an accumulation of erroneous bits. The accumulation of erroneous bits may lead to the loss of data in a zone. The amount of time a zone can safely remain in the open state depends on the type of memory cell (e.g., SLC, MLC, TLC, QLC, or other iterations of multi-level cells) and may range from minutes to days. Pad or dummy data may be used to close a zone that is in an open state, thus preventing errors from occurring in the zone. The decreased time a zone remains in the open and active state may result in a greater reliability of the NVM.

In one embodiment, a storage device comprises of a media unit, wherein the capacity of the media unit is divided into a plurality of zones. The media unit comprises a plurality of dies and each of the plurality of dies comprises a plurality of erase blocks. The storage device further comprises a controller coupled to the media unit. The controller is configured to receive one or more first commands to write data to a first zone of the plurality of zones, wherein the data associated with the one or more first commands is written to a first portion of the first zone, and wherein a second portion of the first zone remains available to write data to. The controller is also configured to determine a predetermined amount of time has passed since receiving a first command to write data to the first zone and write dummy data to the second portion of the first zone to fill the first zone to a zone capacity. The controller is further configured to open a second zone and write the data associated with the one or more second commands to a first portion of the second zone upon receiving one or more second commands to write data to the first zone. The controller is also configured to re-write the data associated with the one or more first commands written to the first portion of the first zone to a second portion of the second zone.

A first zone of a media unit is erased after the data associated with the one or more first commands is re-written to the second portion of the second zone. The predetermined amount of time is between about 15 minutes to about 3 days. The predetermined amount of time is between about 1 day to about 7 days. Writing the dummy data to the second portion of the first zone switches the first zone to a closed and active state. The controller comprises of a timer, and the timer determines the predetermined amount of time has passed. The data stored in the third zone is stored in a non-sequential order.

In another embodiment, a storage device comprises of a media unit, wherein a capacity of the media unit is divided into a plurality of zones. The media unit comprises a plurality of dies and each of the plurality of dies comprises a plurality of erase blocks. The storage device further comprises a controller coupled to the media unit. The controller is configured to receive one or more first commands to write data to a first zone of the plurality of zones, wherein the data associated with the one or more first commands is written to a first portion of the first zone, and wherein a second portion of the first zone remains available to write data to. The controller is also configured to determine a first predetermined amount of time has passed since receiving a first command to write data to the first zone. The controller is further configured to open a second zone and write the data associated with the one or more second commands to a first portion of the second zone upon receiving one or more second commands to write data to the first zone. The controller is also configured to determine a second predetermined amount of time has passed since receiving a second command to write data to the first zone. The controller is further configured to open a third zone and write the data associated with the one or more third commands to a first portion of the third zone upon receiving one or more third commands to write data to the first zone. The controller is also configured to re-write the data associated with the one or more first commands written to the first portion of the first zone to a second portion of the third zone, and re-write the data associated with the one or more second commands written to the first portion of the second zone to a third portion of the third zone.

A first zone of a media unit is filled by writing dummy data to the second portion of the first zone to fill the first zone to a zone capacity upon determining the first predetermined amount of time has passed. A second zone of a media unit is filled by writing dummy data to a second portion of the second zone to fill the second zone to a zone capacity upon determining the second predetermined amount of time has passed. A first zone and a second zone of a media unit is erased upon re-writing the data associated with the one or more first commands to the second portion of the third zone and re-writing the data associated with the one or more second commands to the third portion of the third zone. The first predetermined amount of time is the same as the second predetermined amount of time. The first and second predetermined amount of time is between about 15 minutes to about 7 days. The first predetermined amount of time is different than the second predetermined amount of time.

In another embodiment, a storage device comprises of a media unit, wherein a capacity of the media unit is divided into a plurality of zones. The media unit comprises a plurality of dies and each of the plurality of dies comprises a plurality of erase blocks. The storage device further comprises a controller coupled to the media unit. The controller is configured to write data associated with one or more first commands to a first portion of a first zone. A second portion of the first zone remains available to write data to. The controller is also configured to write dummy data to the second portion of the first zone to fill the first zone to a zone capacity. The controller is further configured to open a second zone and write the data associated with the one or more second commands to a first portion of the second zone upon receiving one or more second commands to write data to the first zone. The controller is also configured to re-write the data associated with the one or more first commands written to the first portion of the first zone to a second portion of the second zone. The controller is further configured to write dummy data to a third portion of the second zone to fill the second zone to a zone capacity upon the timer expiring a second time. The controller is also configured to open a third zone and write the data associated with the one or more third commands to a first portion of the third zone upon receiving one or more third commands to write data to the first zone. The controller is further configured to re-write the data associated with the one or more first commands written to the second portion of the second zone to a second portion of the third zone, and re-write the data associated with the one or more second commands written to the first portion of the second zone to a third portion of the third zone.

A first zone of a media unit is erased after the data associated with the one or more first commands is re-written to the second portion of the second zone. A second zone of a media unit is erased upon re-writing the data associated with the one or more first commands to the second portion of the third zone and re-writing the data associated with the one or more second commands to the third portion of the third zone. The timer is set to expire after a predetermined amount of time, and the predetermined amount of time is between about 15 minutes to about 7 days. Writing the dummy data to the second portion of the first zone switches the first zone to a closed and active state. Writing the dummy data to the third portion of the second zone switches the second zone to the closed and active state. Re-writing the data associated with the one or more first commands to the second portion of the third zone and re-writing the data associated with the one or more second commands to the third portion of the third zone causes the data written to the third zone to be stored out of sequential order.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a memory device, wherein a capacity of the memory device is divided into a plurality of zones; and
   a controller coupled to the memory device, the controller configured to:
     write dummy data to a partially filled first zone of the plurality of zones to fill the first zone to a zone capacity;
     upon receiving one or more commands to write data to the first zone, open a second zone of the plurality of zones and write the data associated with the one or more commands to a first portion of the second zone; and
     re-write the data associated with the partially filled first zone to a second portion of the second zone.

2. The storage device of claim 1, wherein the first zone is erased after the data associated with the partially filled first zone is re-written to the second portion of the second zone.

3. The storage device of claim 1, wherein the dummy data comprises sentinel values.

4. The storage device of claim 1, wherein the dummy data comprises internal drive code for unwritten data.

5. The storage device of claim 1, wherein writing the dummy data to the partially filled first zone switches the first zone to a closed and active state.

6. The storage device of claim 1, wherein the controller comprises a timer.

7. The storage device of claim 1, wherein the data stored in the first zone is stored in a non-sequential order.

8. A storage device, comprising:
   a memory device, wherein a capacity of the memory device is divided into a plurality of zones; and
   a controller coupled to the memory device, the controller configured to:
     determine a predetermined amount of time has passed since receiving a first command to write data to a first zone of the plurality of zones;
     upon receiving one or more second commands to write data to the first zone, open a second zone of the plurality of zones and write the data associated with the one or more second commands to the second zone; and re-write the data associated with the first command written to the first zone to a second portion of the second zone.

9. The storage device of claim 8, wherein the controller is further configured to: write dummy data to the first zone to fill the first zone to a zone capacity upon determining the predetermined amount of time has passed.

10. The storage device of claim 8, wherein the predetermined amount of time is a function whether the memory device is SLC, MLC, TLC, or QLC.

11. The storage device of claim 8, wherein the controller is further configured to: erase the first zone upon re-writing the data associated with the first command to the second zone.

12. The storage device of claim 8, wherein the controller is configured to recognize dummy data as not being user data, XOR data, parity data, or metadata.

13. The storage device of claim 8, wherein the predetermined amount of time is between about 15 minutes to about 7 days.

14. The storage device of claim 8, wherein each zone of the plurality of zones has a same capacity.

15. A storage device, comprising:
   memory means, wherein a capacity of the memory means is divided into a plurality of zones; and
   a controller coupled to the memory means, the controller configured to:
      write data associated with one or more first commands to a first portion of a first zone of the plurality of zones, and wherein a second portion of the first zone remains available to write data to;
      upon a timer expiring a first time, write dummy data to the second portion of the first zone to fill the first zone to a zone capacity;
      upon receiving one or more second commands to write data to the first zone, open a second zone of the plurality of zones and write the data associated with the one or more second commands to a first portion of the second zone;
      re-write the data associated with the one or more first commands written to the first portion of the first zone to a second portion of the second zone;
      upon the timer expiring a second time, write dummy data to a third portion of the second zone to fill the second zone to a zone capacity;
      upon receiving one or more third commands to write data to the first zone, open a third zone of the plurality of zones and write the data associated with the one or more third commands to a first portion of the third zone;
      re-write the data associated with the one or more first commands written to the second portion of the second zone to a second portion of the third zone; and
      re-write the data associated with the one or more second commands written to the first portion of the second zone to a third portion of the third zone.

16. The storage device of claim 15, wherein the controller is further configured to: erase the first zone upon re-writing the data associated with the one or more first commands to the second portion of the second zone.

17. The storage device of claim 15, wherein the controller is further configured to: erase the second zone upon re-writing the data associated with the one or more first commands to the second portion of the third zone and re-writing the data associated with the one or more second commands to the third portion of the third zone.

18. The storage device of claim 15, wherein the timer is set to expire after a predetermined amount of time, and wherein the predetermined amount of time is between about 15 minutes to about 7 days.

19. The storage device of claim 15, wherein writing the dummy data to the second portion of the first zone switches the first zone to a closed and active state, and wherein writing the dummy data to the third portion of the second zone switches the second zone to the closed and active state.

20. The storage device of claim 15, wherein re-writing the data associated with the one or more first commands to the second portion of the third zone and re-writing the data associated with the one or more second commands to the third portion of the third zone causes the data written to the third zone to be stored out of sequential order.

\* \* \* \* \*